UNITED STATES PATENT OFFICE.

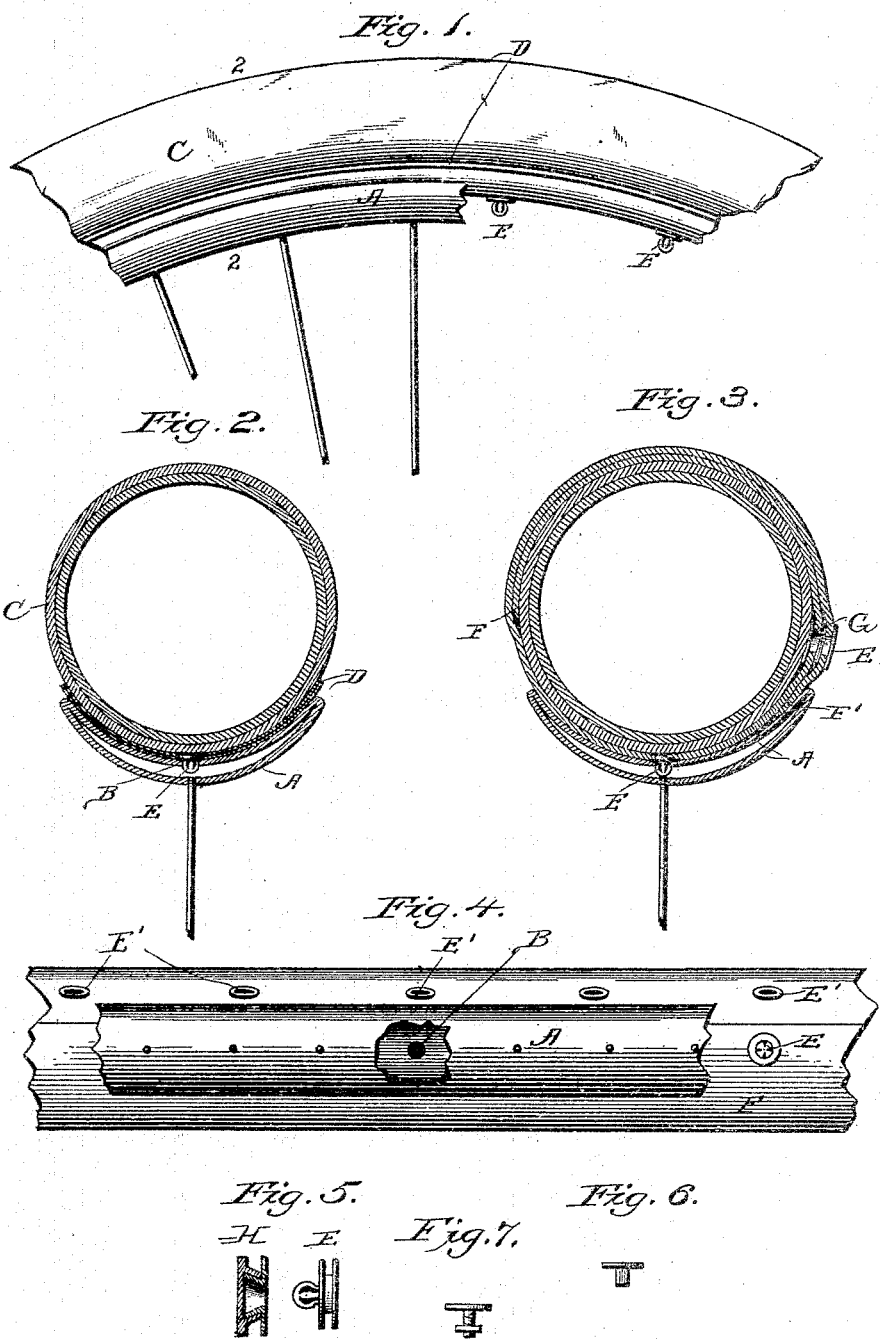

ALEXANDER STRAUS, OF NEW YORK, N. Y.

CYCLE-TIRE.

SPECIFICATION forming part of Letters Patent No. 491,386, dated February 7, 1893.

Application filed February 27, 1892. Renewed January 5, 1893. Serial No. 457,385. (No model.)

*To all whom it may concern:*

Be it known that I, ALEXANDER STRAUS, a citizen of the United States, residing at New York, in the county of New York and State of New York, have invented certain new and useful Improvements in Cycle-Tires; and I do hereby declare the following to be a full, clear, and exact description of the invention, such as will enable others skilled in the art to which it appertains to make and use the same.

My invention is in the means for securing cycle tires to the wheel rim, and for securing tire coverings in place, the object being to avoid cemented or vulcanized union and to secure the greatest possible convenience in attachment and detachment of both the whole tire and the cover when the latter is used either as a complete or partial envelope of the inner tube.

The invention is intended for and is especially applicable to pneumatic tires, but it may be used with either the solid or the cushion type.

In the accompanying drawings:—Figure 1 is a side view of a segment of a pneumatic tire and rim embodying my invention. Fig. 2 is a radial section of the same tire and rim. Fig. 3 is a like section showing the application of the invention to a tire composed of a tube completely enveloped in a protecting cover. Fig. 4 shows a portion of the tire cover, looking radially outward. Fig. 5 shows, on a larger scale, details of a desirable form of button or stud for securing the cover where a completely enveloping cover is employed. Figs. 6, 7 show modified forms of studs that may be used for securing to the rim.

The tire, with or without a cover as a part of it, is provided with a series of studs that enter apertures in the wheel rim, and these are found sufficient to hold the tire in place, no cement being employed. The cover is provided at one edge with a series of studs and at a suitable distance therefrom with a series of apertures which the studs enter when the cover is wrapped about the inner core or tube with the stud-bearing edge overlapping the other portion.

In the drawings A is a wheel rim having a series of preferably equidistant apertures B, which may extend through the outer wall only of the hollow rims, may be complete perforations, or may be simply recesses or cavities formed in the wall whether the rim be hollow or solid.

C (Figs. 1, 2) is a pneumatic tube having a stud-bearing strip D of canvas formed in, vulcanized to, or cemented upon that face intended to lie next the rim, the studs E being so placed as to register with the apertures in the rim. If now the tube be deflated the tire is readily put in place with the studs lying in the corresponding apertures; and if when this is done, it be inflated, the tire is practically non removable while inflation continues, and the wheel is ready for use. It is plain that the canvas may cover any part or even the whole of the inner tube.

In Fig. 3 the canvas is part of a protecting cover F not cemented at any point to the inner tube. In this case the cover is shown as extending one and a half times about the tube in such manner as to give two cover-layers over the tread of the tire. Near the edge of the overlapping layer is a series of studs E' each of which enters a recess G in that portion of the cover lying immediately beneath, the cover being preferably thickened or reinforced along the line of the apertures. The parts are preferably so arranged that the free margin F' of the cover may lie between the body of the tire and the wheel rim, so that no edges are exposed. The studs E as before enter apertures in the wheel rim. All the studs are preferably of the form shown in Fig. 5 where they are represented as similar to well known glove-fasteners. When this form is used eyelets H are preferably employed to receive the studs in the overlapping portion of the cover. The studs, however, may be simply solid studs of metal or other suitable material, or they may be buttons of any suitable material adapted to enter corresponding button holes. So also those intended to enter the rim may be hooked or provided with a thread and nut.

In using the word "stud" or "button" in the specification and claims, I do not intend to limit myself to the exact form shown, the word being understood to cover plain, hooked, threaded, perforated, notched or otherwise formed projections adapted for securing the tire to the rim. It is understood, as a matter of course, that the canvas may be canvas alone or canvas and rubber or other suitable material, it being common to vulcanize rubber to such strips.

What I claim is:—

1. The combination with a wheel rim, of a tire lying therein and a tire cover, consisting of an endless strip, wrapped about the tire, and having its overlapping side or edge secured by a series of studs lying without the surface covered by the rim.

2. As a tire cover, an endless strip adapted to be wrapped about the tire tube and by overlapping to form a double thickness upon the tread, a series of buttons or studs arranged to engage, when the parts are thus overlapped, securing the overlapping part to the part overlapped.

3. The combination with an endless-strip tire cover opening laterally along a line outside of, or beyond, the surface to be met by the rim, of means for securing the edge of the cover along the line of such lateral opening, and a series of studs, in the plane of the wheel, projecting from said surface, substantially as and for the purpose set forth.

4. Cycle tire consisting of an inner pneumatic tube and an endless cover wrapped about the same and having its overlapping edge secured by buttons or studs and having along the portion next the wheel rim, a series of projecting studs adapted to enter apertures in the rim.

In testimony whereof I affix my signature in presence of two witnesses.

ALEXANDER STRAUS.

Witnesses:
VICTOR E. BURKE,
ROBERT J. CUMMINGS.